Jan. 6, 1925.

H. O. OLSON 1,522,074

AGRICULTURAL MACHINE

Filed April 21, 1923

Inventor

Henry O. Olson

By Lacey & Lacey, Attorneys

Jan. 6, 1925.

H. O. OLSON 1,522,074

AGRICULTURAL MACHINE

Filed April 21, 1923      2 Sheets-Sheet 2

Inventor

Henry O. Olson

By Lacey & Lacey, Attorneys

Patented Jan. 6, 1925.

1,522,074

UNITED STATES PATENT OFFICE.

HENRY O. OLSON, OF HARPERS FERRY, IOWA.

AGRICULTURAL MACHINE.

Application filed April 21, 1923. Serial No. 633,636.

*To all whom it may concern:*

Be it known that I, HENRY O. OLSON, a citizen of the United States, residing at Harpers Ferry, in the county of Allamakee and State of Iowa, have invented certain new and useful Improvements in Agricultural Machines, of which the following is a specification.

This invention relates to machines for tilling the soil and planting seed, and has for its object the provision of an inexpensive and durable machine by the use of which seed may be planted at the same time the ground is pulverized. The invention is illustrated in the accompanying drawings and will be hereinafter fully set forth.

In the drawings:

Figure 1 is a plan view, partly broken away, of a machine embodying my invention;

Figure 2:
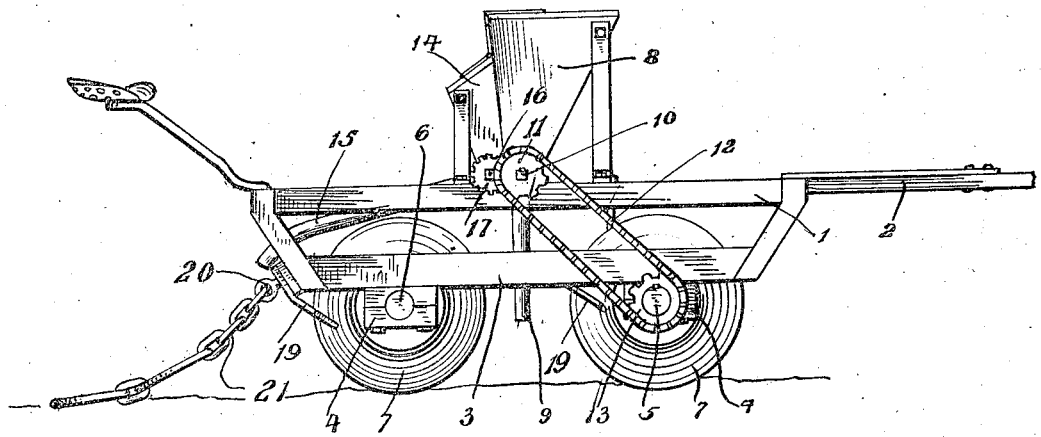
Fig. 2 is a side elevation of the same.
Figure 3:
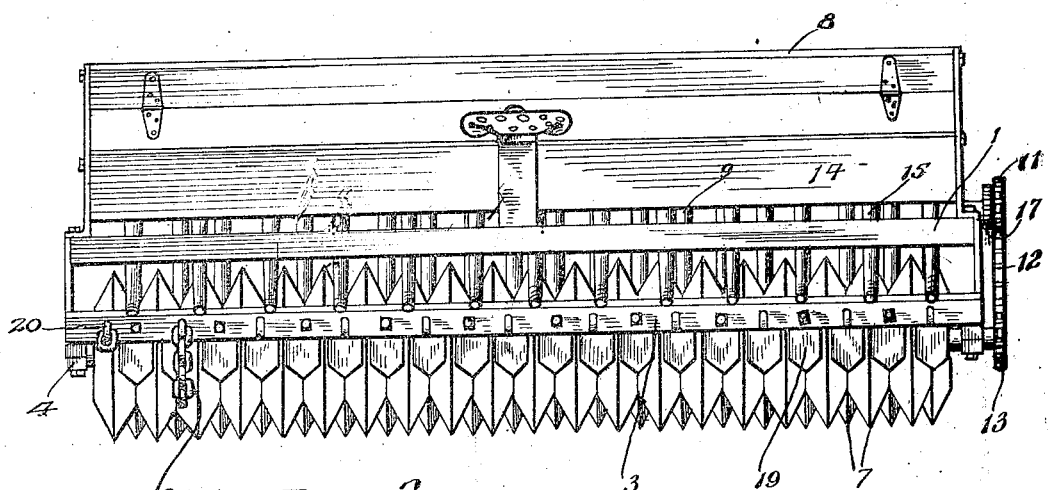
Fig. 3 is a rear elevation.

In carrying out my invention, I employ a frame 1 which is rectangular in plan view and consists of cross bars and side bars rigidly secured together. To the front cross bar of the frame is secured a draft pole or tongue 2, and depending from the main frame is a supplemental frame 3 which is of the same general form as the main frame. At the sides of the supplemental frame, I secure thereon journal boxes 4 in which are mounted axles 5 and 6, each of which carries a gang of rollers 7 having ridged or substantially conical circumferential surfaces, the rollers of the two gangs being staggered relative to each other, as will be readily understood upon reference to Figs. 1 and 3. As the machine is drawn over the ground, the front gang of rollers will cut into the soil so as to produce furrows and the rear gang of rollers will ride upon and cut through the ridges between the furrows produced by the front gang so that the surface will be left in a finely pulverized condition in which the seeds will quickly germinate. It will be readily understood also that, if seeds be deposited in the furrows or troughs formed by the front gang of rollers, the dirt turned aside from the ridges by the second gang of rollers will be thrown over the seeds so that they will be at once covered.

Secured upon the main frame transversely thereof is a hopper or seed box 8 which may be of any well-known construction and from the bottom of which a plurality of seed spouts 9 depend between the front and rear rollers. Obviously the seed from the hopper will flow through these seed spouts and they are so arranged that each spout will be alined with the peak or ridge of a roller in the front gang and, consequently, the seed will be deposited in the furrows formed by said gang of rollers. A shaft 10 extends through the bottom of the hopper 8 so as to agitate the seed therein and effect the feeding of the same through the seed cups and the spouts in the usual manner, and to actuate the said shaft a sprocket 11 is secured upon one end of the same, a chain 12 being trained around the said sprocket and a sprocket 13 on the axle 5 of the front rollers.

Disposed against the back wall of the hopper 8 and supported by the same and by the main frame is a supplemental hopper 14 from which discharge spouts 15 extend rearwardly over the rear gang of rollers to deliver seed onto the ground in rear of the same. This hopper 14 is intended more particularly for carrying grass seed or other small seed which is sown broadcast, and through the bottom of the same is extended an agitating shaft 16 equipped at one end with a pinion 17 which is adapted to mesh with a similar pinion 18 on the seed shaft 10. The pinion 17 will be mounted upon the shaft 16 in any manner which will permit its ready removal when it is desired to throw the said shaft out of gear or the pinion may be slidably mounted or otherwise arranged so that the operation of the said shaft 16 may be controlled at will.

To the rear cross bar and to an intermediate cross bar of the frame 3, I secure a plurality of scrapers 19 which extend downwardly and forwardly therefrom to bear against the surfaces of the rollers in the respective gangs and scrape therefrom any dirt that may tend to cling thereto. These scrapers may be conveniently secured in place by eye bolts, as shown at 20, and to the said eye bolts I attach the front ends of spreaders or eveners 21 which consist of chains or loosely connected rings and are adapted to run free upon the ground in rear of the machine so that the spreading of the surface soil will be even and complete.

As the machine is drawn over the field, the action of the rollers upon the soil will thoroughly cut up and pulverize the same and at the same time press the surface soil so that it will be very firm and will hold any moisture that may be in the ground and also prevent the seed deposited therein being blown away. The machine is compact, strong and durable and by its use seed will be deposited in furrows immediately after the latter are formed and will then be at once covered with a fine mulch so that germination will be rapid and very few failures to germinate will develop. The machine may be utilized to plant any desired crop or to plant grass seed for lawns or pasturage as may be preferred, and it may be possible also by the use of the machine to simultaneously plant grass and other seeds to which the grass is not a detriment.

Having thus described the invention, what is claimed as new is:

An agricultural machine comprising a main frame, including side bars and cross bars firmly connected, a pair of depending supports rigidly fixed to each of said side bars, and a supplemental frame having side bars and a rear cross bar rigidly connected to said depending supports, front and rear journal boxes on the side bars of said supplemental frame, axles mounted in said journal boxes each of said axles being provided with a gang of rollers having ridged circumferential surfaces and spreader chains attached to the rear bar of said supplemental frame, seed dispensing means mounted upon said main frame provided with spouts delivering behind the respective gangs of rollers and in alinement with the respective ridges thereof, and means for actuating said seed dispensing means.

In testimony whereof I affix my signature.

HENRY O. OLSON. [L. S.]